Patented Mar. 11, 1941

2,234,548

UNITED STATES PATENT OFFICE 2,234,548

PHENOLIC RESIN

James L. Brannon, Plainfield, N. J., assignor, by mesne assignments, to Union Carbide and Carbon Corporation, New York, N. Y., a corporation of New York No Drawing. Application November 27, 1937, Serial No. 176,809

21 Claims. (Cl. 260—57)

This invention relates to synthetic resins of the phenolic type and to processes for their preparation. More particularly, it embraces methods for catalytically condensing phenol-aldehyde resins by means of organic bases and the improved products prepared therefrom.

Heretofore resin condensations, notably those known as one-step processes, have been effected in the presence of inorganic basic catalysts, such as the alkali-metal hydroxides, the alkaline-earth hydroxides and ammonia. A number of difficulties, however, are encountered when such alkaline catalysts are used, and particularly when relatively large amounts of these catalysts are added. For example, light colored and light-resistant phenolic resins have been prepared by condensing phenol and formaldehyde with considerable quantities of potassium or sodium hydroxide, i. e. about 4% of the phenol by weight; and after condensation, the reaction mixture has been neutralized with a suitable organic acid such as lactic, oxalic or citric acid and the mixture then dehydrated. The presence of considerable amounts of potassium or sodium hydroxide maintains the resinous products in solution, and usually some of the resinous products remain in solution after the mixture is made definitely acid and separation into resinous and aqueous layers occurs. This renders the removal of any salts formed by such processes as decantation of the aqueous layer and washing of the resinous layer very difficult if not impossible, because an appreciable portion of the resin is removed with the aqueous layer and the wash water; moreover, washing tends to affect the resin adversely in that the resin usually becomes so viscous that the step of casting it into molds is rendered unduly difficult. On the other hand, if these salts or their aqueous solutions are not removed, a resin of lowered water resistance results; and, if hardened, the resin becomes murky and cloudy because of the tendency of the salts to precipitate out of the resin. These defects may be overcome somewhat by the addition of water soluble plasticizers, such as glycerol, glucose, and ethylene glycol, among others, which render the resin transparent; but these added plasticizing substances further decrease the water resistance of the resin, causing it to sweat and distort in humid climates, and the resin so produced is soft, readily scratched and easily deformed.

The present invention avoids these disadvantages and provides light colored transparent resins which when fully hardened can be had in a clear, transparent form, resistant to water, abrasion and deformation. It accomplishes these ends by the condensation of a phenol and a methylene-containing substance in the presence of an organic base of the "onium" type, by which term as herein used is meant any one of the numerous quaternary ammonium, sulfonium, phosphonium, arsonium, stibonium or pyridinium bases and the phenolic salts thereof. More particularly, the quaternary ammonium bases include compounds having the general formula:

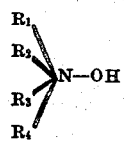

wherein $R_1$, $R_2$, $R_3$, and $R_4$ may be alkyl, aryl or aralkyl groups, or corresponding compounds formed from other radicals analogous to ammonium, such as pyridinium. Among the more specific quaternary ammonium bases given by way of example are: tetramethyl ammonium hydroxide, tetraethyl ammonium hydroxide, dimethyl cyclohexyl benzyl ammonium hydroxide, trimethyl cyclohexyl ammonium hydroxide, dimethyl phenyl benzyl ammonium hydroxide, etc.; methyl pyridinium hydroxide is illustrative of the pyridinium compounds. These, as well as diethyl methyl sulfonium hydroxide, tetramethyl phosphonium hydroxide, tetramethyl arsonium hydroxide, etc. among still other "onium" compounds, can be used in the form of aqueous solutions of approximately 40% strength or alternatively in the form of the phenol salts of the base.

In the practice of this invention, a phenol and an aldehyde are reacted in the presence of one of the above quaternary "onium" bases or its phenolic salt until phase separation occurs as shown by cooling a sample or by adding a small amount of water to a sample whereupon separation into a resinous and an aqueous layer takes place. The reaction mixture is then acidified, preferably with an organic acid such as citric, lactic, oxalic or benzoic, among others, and the aqueous layer that forms is removed as by decantation or distillation; for example, the aqueous layer can be decanted, the water distilled from the aqueous layer, and the residue added to the resinous layer.

Liquid resins can be prepared using the same quaternary bases without subsequent neutralization or acidification of the reaction mixture; such resins, for instance, are effective wetting agents in the treatment of abrasives for molding grinding wheels and similar articles. If paraform, or some other solid polymer of formaldehyde, or if a more concentrated solution of formaldehyde is used in the reaction, separation of the reaction mixture into layers may not occur; in such cases dehydration to the extent desired is obtained by distillation.

In general, in carrying out this invention, 1 mol of phenol is reacted with 2 mols of formaldehyde; this is found to be a satisfactory proportion of the reactants but the ratio of phenol to formaldehyde is not critical and a range of from .4 mol to 3 mols of formaldehyde can be used or more preferably 0.8 to 2.5 mols. The amount of base used can also vary considerably; preferably, however, the quantity of base used should be sufficient to render the resinous mixture definitely alkaline to litmus.

The reaction product can be variously processed. Thus, it may be dehydrated to the point where it is still fluid enough at room temperature to be cast by pouring into molds but heat-hardenable at atmospheric or super-atmospheric pressure. Or it can be dehydrated until it becomes hard and brittle when cooled in ice water whereupon it can be ground, mixed with fillers such as wood flour, asbestos, cotton flock, and the like and molded under heat and pressure. Or again the resin dehydrated while still liquid can be dissolved in alcohol, acetone, or ethyl acetate and the resultant solutions used as a varnish base or for impregnating paper, textiles, wood veneer, etc.

By the preparation of resins in accordance with the present invention, it is found that, contrary to the usual experience when bases are present in high concentrations, that the "onium" type or quaternary onium base facilitates a sharp separation into a resinous layer and an aqueous layer; these layers form although the reaction mixture is alkaline to litmus and when the quaternary onium bases are present in concentrations higher than those normally sufficient to prevent separation when inorganic basic catalysts are used. The greater proportion of the quaternary base remains in the resinous product where it apparently acts as a plasticizer and renders the resin less viscous than when formed in the presence of an inorganic base. Then, again, the salts formed upon acidification of the reaction mixture can be left in the resin without causing such deleterious effects as cloudiness or otherwise affecting the transparency of the final product. Moreover, the resins can be heat hardened to a state where they become unusually resistant to moisture, abrasion and deformation without losing their transparency.

Because of these peculiarities, a reaction mixture, such as the phenol-aldehyde type, when catalyzed by a quaternary onium base, permits of considerable diversification and modification from the usual relatively inflexible procedure for the preparation of a resin. Thus, the resinous reaction mixture while still alkaline may be separated into a resinous and an aqueous layer; then the resinous layer may be withdrawn with only a small proportion (approximately 15%) of the resin remaining in the aqueous layer; the resinous layer can be dehydrated and dissolved in alcohol, acetone, ethyl acetate or similar solvents to give a solution useful as a varnish base, or after acidification it can be dehydrated and leave a resin having a viscosity low enough to facilitate its being readily cast by pouring into molds for subsequent curing and heat hardening.

The quaternary onium base catalysts disclosed herein may be prepared by any of the methods described in Beilstein, Handbuch der Organischen Chemie, in particular see volume IV, page 50 thereof. The phenolic salts of these onium bases are readily prepared by treating the halogen salts of the particular quarternary base desired with, for example, sodium phenate and phenol, whereupon the corresponding quaternary phenate is precipitated in phenol solution.

In order to illustrate the methods and practice of this invention a number of examples, wherein various quaternary onium bases are used, are included herein.

*Example 1.*—1000 parts of phenol, 2000 parts of a 37% aqueous solution of formaldehyde and 217 parts of a 20% aqueous solution of tetramethyl ammonium hydroxide are reacted by heating the mixture to 80° C. at atmospheric pressure; the reaction mixture is maintained at 80° C. until a sample cooled to 30° C. fogs by forming two phases and an analysis thereof shows but 2–3% of formaldehyde still remaining unreacted; then the reaction mixture is dehydrated by heating at an absolute pressure of 25–30 mm. until it begins to thicken and attains a temperature of approximately 50° C. Thereupon 160 cc. of a 4 N. solution of tartaric acid is added and the mixture is dehydrated by heating at the same pressure of 25–30 mm. until the resin attains a temperature of 85° C., after which 80 gms. of glycerine is added and dehydration continued with further heating under reduced pressure until the resin attains a temperature of 90° C. The resulting resin is practically water-free and is a liquid having a viscosity of 25–30 centipoises at room temperature when measured as a methyl alcohol solution containing 60% resin. The resin is clear and water-white and can be cast into open molds and solidified or cured by heating at 75° to 80° C. over a period of two to five days, the duration of the heating period depending on the hardness desired in the finished product; alternatively, the liquid resinous product can be dissolved in a suitable solvent for use as an ingredient for varnish, paper size and the like.

The hardened cast resin product prepared in accordance with this example is practically water-white, transparent in sections up to four inches in thickness, has a Brinell hardness as measured with a 5 mm. ball of 15–18 and may be sliced, sawed, turned, threaded, tapped and otherwise fabricated without much difficulty. The resin is resistant to water; it is unaffected when immersed for periods up to 30 minutes in boiling water, and absorbs relatively little water when totally immersed in water for a period of several months.

*Example 2.*—1000 parts of phenol, 2000 parts of a 37% aqueous solution of formaldehyde and 400 parts of a 40% aqueous solution of trimethyl benzyl ammonium hydroxide are reacted by heating the mixture to 75° C. at atmospheric pressure; the reaction mixture is maintained at 75° C. for 3½ hours, or until a sample cooled to 30°

C. fogs, and an analysis thereof shows less than 2% of formaldehyde still remaining unreacted; then the reaction mixture is dehydrated by heating at an absolute pressure of 25–30 mm. until it begins to thicken, whereupon 362 cc. of a 6 N. solution of citric acid is added and the mixture is dehydrated and volatile substances removed by heating at a pressure of approximately 30 mm. until the resin attains a temperature of 100° C., or has a viscosity of 25–30 centipoises when measured as a methyl alcohol solution containing 60% resin. The resin can be cast into open molds and solidified or cured by heating at 80° C. over a period of two to five days, the duration of the heating period depending on the hardness desired in the finished product.

The hardened cast resin product prepared in accordance with this example is transparent in sections up to ¼ of an inch in thickness and is translucent in thicker sections; otherwise it has the properties of the resin produced in accordance with the method of Example 1.

As an alternative procedure up to the step where the acid is added, the reaction mixture can be heated for 1 hour at 75° C. at atmospheric pressure; the reaction mixture is then maintained at 75° C. for two hours while water and volatile substances are removed; the remaining steps, including acidification, are similar to those above given.

*Example 3.*—1000 parts of phenol, 2000 parts of a 37% aqueous solution of formaldehyde, and 140 parts of a 19% aqueous solution of di-cyclohexyl di-methyl ammonium hydroxide are refluxed for approximately 70 minutes at atmospheric pressure or until a sample cooled to 75° C. fogs, and an analysis thereof shows not more than 4% of formaldehyde still remaining unreacted; the mixture is then cooled to approximately 25° C. and allowed to settle for one to two hours at the end of which time it separates into two layers. The upper or supernatant layer being principally water is decanted off and a sufficient quantity of 2 N. hydrochloric acid is added to the lower resinous layer until it has a pH of 4.5 to 5.0; then the resinous layer is dehydrated by heating at an absolute pressure of 30 mm. until it attains a temperature of 85° C. The resulting resin has a viscosity of 25–30 centipoises when measured as a methyl alcohol solution containing 60% resin and may be cast into open molds and solidified or cured by heating over a period of three to six days, the duration of the heating period depending on the hardness desired in the finished product.

The hardened cast resin product prepared in accordance with this example is transparent in sections up to ¼ of an inch in thickness and very slightly translucent in thicker sections; otherwise it has the properties of the resin produced in accordance with the method of Example 1.

The products contained in the decanted supernatant aqueous layer can be recovered by boiling off the water under reduced pressure; after their recovery, they may be added to the resinous layer before its acidification or they can be added to the next batch of raw material to be prepared.

*Example 4.*—600 parts of meta-cresol, 400 parts of para-cresol, 1500 parts of a 37% aqueous solution of formaldehyde and 200 parts of a 40% aqueous solution of trimethyl benzyl ammonium hydroxide are reacted by heating the mixture to 80° C. at atmospheric pressure. The reaction is exothermic and considerable cooling is necessary to maintain the mixture at 80° C. An analysis as by test samples taken from the reaction mixture at various time intervals shows that the formaldehyde is used very rapidly, thus:

| Duration of reaction at 80° C. | Percentage of formaldehyde |
| --- | --- |
| | *Percent* |
| 0 | 20.5 |
| 15 minutes | 6.8 |
| 25 minutes | 4.8 |
| 35 minutes | 3.9 |
| 45 minutes | 3.4 |

(This reaction velocity is about four times as fast as that of the other examples given herein which use phenol instead of cresol.)

The reaction mixture is maintained at 80° C. for 45 minutes, whereafter the resin precipitates and the mixture becomes foggy; then the reaction mixture is cooled by reducing its pressure to the vapor pressure of the mixture and the volatile substances therein are removed by boiling; when the pressure becomes approximately 25 mm. the mixture is dehydrated by heating until the resin becomes clear and begins to thicken, whereupon 181 cc. of a 6 N. solution of citric acid is added and the mixture is further dehydrated by heating at a reduced pressure until the resin attains a temperature of 90° C., after which 80 gms. of glycerine is added and dehydration continued with further heating at a pressure of 25 mm. until it attains a temperature of 100° C. The resulting liquid resin can be cast into open molds and solidified by heating at approximately 80° C. over a period of two to five days; the duration of the heating period depending on the hardness desired in the finished product; alternatively, the liquid resinous product can be dissolved in a suitable solvent for use as an ingredient for varnish, paper or textile size, and the like.

The hardened cast resin product prepared in accordance with this example is water-white and transparent in sections having a thickness of 1 inch and is more resistant to water than the resin of Example 1; it is unaffected and shows no noticeable blistering or whitening when immersed in boiling water for an hour.

*Example 5.*—1000 parts of phenol, 1560 parts of a 37% aqueous solution of formaldehyde and 200 parts of a 40% aqueous solution of benzyl trimethyl ammonium hydroxide are reacted by heating the mixture at 80° C. until a sample cooled to 40° C. fogs; the remaining steps, including dehydration, acidification, etc., are the same as given above in Example 1.

A hardened cast resin product prepared in accordance with this example is water-white and transparent in sections as thick as 4 inches.

*Example 6.*—1000 parts of phenol, 762 parts of a 37% aqueous solution of formaldehyde, and 25 parts of a 40% aqueous solution of trimethyl benzyl ammonium hydroxide are refluxed for 3 hours at atmospheric pressure or until the reaction mixture becomes turbid whereupon 10 gms. of lactic acid is added and the mixture is dehydrated by heating at an absolute pressure of 25 mm. until the resin attains a temperature of 95° C. or until a sample dropped into water having a temperature of 10 to 11° C. forms a hard brittle mass.

The resin can be cast into open molds and solidified or cured by heating at 130° C. at a pressure of 100 pounds for 16 hours. The hardened cast resin product formed is transparent, can be readily machined or turned and may be highly polished; it can be immersed in boiling water for more than an hour without noticeable injury.

*Example 7.*—1500 parts of phenol, 3000 parts of a 37% aqueous solution of formaldehyde and 300 parts of a 40% aqueous solution of trimethyl benzyl ammonium hydroxide as a base are reacted by heating the mixture at 80° C. until a sample cooled to 30° C. fogs, after which the reaction mixture is allowed to settle for two hours and forms two layers. After the upper or supernatant layer is decanted off and concentrated under reduced pressure to remove water and volatile substances, there remains a resinous residue containing 19 parts of the base. After the lower resinous layer is concentrated under reduced pressure to remove water and volatile substances, there remains a resinous residue containing 101 parts of the base. These two resinous residues can be combined, acidified and concentrated by heating at 90° to 100° C. at a pressure of 25 mm. to yield a viscous easily poured resin. This liquid resin can be cast into open molds and solidified by heating at 75° to 80° C. over a period of two to five days, depending upon the hardness desired in the finished product.

The hardened cast resin product prepared in this manner is water-white and transparent in sections as thick as 4 inches; its remaining properties are similar to those given in Example 1.

*Example 8.*—500 parts of phenol, 1000 parts of a 37% aqueous solution of formaldehyde and 180 parts of a 16% aqueous solution of diethyl methyl sulfonium hydroxide are reacted for approximately 3 hours at 80° C. until a sample cooled to 25° C. becomes turbid and approximately 3.4% of the formaldehyde still remains unreacted. This reaction mixture is dehydrated by heating at an absolute pressure of 25 mm. until the resin attains a temperature of 50° C., whereupon 38 parts of citric acid dissolved in 38 parts of water is added and the mixture is dehydrated by heating at a pressure of 25 mm. until the resin attains a temperature of 90° C. Then 40 parts of glycerine is added, thoroughly mixed with the resin and the latter cast into open molds and solidified or cured by heating at 78° C. for 90 hours.

This hardened cast resin is transparent and has a pale straw color; it machines well and is water resistant.

*Example 9.*—A resin prepared similarly to that of Example 8 but without the addition of glycerine becomes hard after 75 hours of heating at 78° C. This hardened cast resin is transparent, pale straw in color and can be machined, threaded, tapped and otherwise fabricated.

*Example 10.*—1000 parts of phenol, 2000 parts of a 37% aqueous solution of formaldehyde and 250 parts of a 20% aqueous solution of tetramethyl phosphonium hydroxide are reacted by heating the mixture to 80° C.; the reaction mixture is maintained at this temperature for 3 hours, after which it is cooled to room temperature, the mixture becoming foggy. It is then dehydrated by heating at an absolute pressure of 25 to 30 mm. during which interval it becomes clear again and begins to thicken, whereupon 104 parts of a 50% aqueous solution of lactic acid is added and the mixture is further dehydrated by heating at a reduced pressure until the resin attains a temperature of 85° C., after which 80 gms. of glycerine is added and dehydration continued with further heating at a reduced pressure until it attains a temperature of 90° C. The resulting resin can be cast into molds and heat hardened; alternatively, it can be dissolved in a suitable solvent or similarly otherwise processed in accordance with the previously described examples.

*Example 11.*—730 parts of phenol, 2000 parts of a 37% aqueous solution of formaldehyde and 360 parts of trimethyl benzyl ammonium phenate are reacted by heating the mixture at 80° C. at atmospheric pressure, until a sample cooled to 30° C. fogs by forming two phases and 2 to 3% of the formaldehyde still remains unreacted. This reaction mixture is dehydrated by heating at an absolute pressure of 25–30 mm., until the resin begins to thicken and it attains a temperature of approximately 50° C., whereupon 160 cc. of a 4 N. solution of tartaric acid is added and the mixture is dehydrated by heating at a pressure of 25–30 mm. until the resin attains a temperature of 85° C. Then 80 gms. of glycerine is added and the mixture is further dehydrated under a reduced pressure until the resin attains a temperature of 90° C.

The resin is sufficiently free of water and has a viscosity of 25–30 centipoises when measured as a methyl alcohol solution containing 60% resin. The resin is a clear water-white liquid which can be cast into open molds and solidified by heating at 75–80° C. over a period of two to five days, the duration of the heating depending on the hardness desired in the finished product; alternatively, the liquid resinous substance can be dissolved in a suitable solvent for use as a varnish, a paper size, or for various other purposes.

The hardened cast resin prepared in accordance with this process is practically water-white, transparent in sections having a thickness of 4 inches, has a Brinell hardness as measured with a 5 mm. ball of 15 to 18, and it may be readily sliced, sawed, turned, threaded, tapped or otherwise fabricated. This resin is relatively water resistant; it is unaffected by immersion in boiling water for periods up to 30 minutes, and absorbs relatively little water when totally immersed in water for a period of several months.

The particular phenate used in Example 11 can be prepared as follows: 107 parts of benzyl chloride under a reduced pressure of 200 mm. in a stainless steel still, has 200 parts of a 25 to 26% aqueous solution of trimethylamine added thereto and the contents is agitated for 30 minutes without allowing the temperature to exceed 60° C. This reaction mixture is then distilled under a reduced pressure until a distillate, comprising principally water and some unreacted benzyl chloride or trimethylamine and having a mass about 20% of the original reaction mixture, is collected. To the residue in the still, an aqueous solution comprising 720 parts of water, 34.50 parts of sodium hydroxide and 485 parts of phenol is added, the mixture well agitated for approximately one minute and then allowed to settle for 15 minutes or until it separates into two distinct layers. The lower layer consisting of trimethyl benzyl ammonium phenate in phenol solution is the desired substance.

In a similar manner, various other phenolic salts of the "onium" bases can be prepared, such as triethyl benzyl ammonium phenate, tetramethyl arsonium phenate, trimethyl sulfonium phenate, di-cyclohexyl di-methyl ammonium phenate, among others.

*Example 12.*—1000 parts of phenol, 2000 parts of a 37% aqueous solution of formaldehyde and 277 parts of a 19% aqueous solution of methyl pyridinium hydroxide are reacted by heating the mixture at 80° C., until a sample cooled to 25° C. fogs by forming two phases. Then 75 gms. of citric acid is added and the mixture dehydrated by heating at an absolute pressure of 25 to 30 mm. until the temperature of the resin reaches 90° C. This resin is sufficiently free of water to be suitable for casting, solution in volatile solvents and other and similar processing as described in the previous examples.

Example 13.—500 parts of phenol, 1000 parts of a 37% aqueous solution of formaldehyde and 370 parts of a 10% aqueous solution of tetramethyl arsonium hydroxide are reacted by heating the mixture to 80° C.; the foggy two phase mixture at first formed clears when the reaction takes place and the mixture cools to approximately 40° C. Then the reaction mixture is heated for approximately two and one-half hours at 80° C. whereupon a sample cooled to 20° C. becomes turbid; then 90 cc. of a 6 N. solution of citric acid is added and the resin is dehydrated by boiling off water at an absolute pressure of 30 mm. until the resin attains a temperature of 100° C., whereupon 40 gms. of glycerine is added with stirring.

This resin can be cast into open molds and solidified by heating at 90° C. over a period of 20 to 30 hours, the duration of the heating depending on the hardness desired in the final product; alternatively, the liquid resinous substance can be dissolved in a suitable solvent for use as a varnish, paper size, or for various other purposes.

Example 14.—425 parts of a 40% aqueous solution of tetramethyl benzyl ammonium hydroxide is dissolved in 4000 parts of phenol and the solution heated to 75° C., whereupon 2000 parts of paraform is added in small portions and with vigorous agitation throughout a period of 3½ hours so that the temperature of the reaction mass never exceeds 85° C. during this period; then the reaction mass is heated to 80° C. for two hours or until the reaction mass attains a kinematic viscosity of 2000 at 25° C., whereupon 2400 parts of phenol is dissolved in the reaction mass and the mixture cooled to room temperature to yield a dark red-brown balsam-like material having a kinematic viscosity of 525 at 25° C.

An abrasive mixture is prepared by mixing 875 parts of No. 50 aluminum oxide grain and 20 parts of the above resin for 2 to 3 minutes after which 105 parts of a potentially reactive heat-hardenable powdered phenol-formaldehyde resin is added and stirred therein for about 5 minutes; this mixture is screened through a No. 20 screen and 130 grams of the screenings is cold molded under a pressure of 3000 pounds per square inch to form bars 6" x 1" x ½". These bars are heat-hardened by heating them up to 88° C. over a period of ½ hour, then held at 88° C. for 15 hours, then heated from 88 to 177° C. over a period of 8½ hours and finally held at 177° C. for 7¾ hours, after which they are cooled to room temperature (30° C.) in an oven.

Bars made in accordance with the foregoing had a higher flexural strength than similar bars prepared from an abrasive mixture containing a liquid resin made with a sodium hydroxide base. The bars in which the "onium" material was used showed an 11.6% loss in flexural strength after immersion in water at room temperature for seven days, whereas the bars in which the sodium hydroxide was used showed a 19.2% loss under the same conditions.

The proportions given in the above examples are all parts by weight. The resins prepared in accordance with the methods of this invention have a marked solvent action, particularly for cellulose fibers; this property is attributed to the quaternary onium compounds utilized in their preparation. Moreover, resins prepared in this manner appear to penetrate cellulose fibers and readily wet these fibers when used as filling or impregnating materials. These properties make possible the production of filled materials low in resin content, yet glossy or translucent in appearance, strong and resistant to water solubility and mechanical stress.

It is to be understood that the examples herein given are merely illustrative and not limitative of this invention which may be variously otherwise embodied within the scope of the appended claims.

What is claimed is:

1. The method of preparing a phenolic condensation product which comprises reacting phenol with formaldehyde in the presence of tetramethyl ammonium hydroxide until a resin is precipitated upon the addition of water to a cooled sample of the reaction mass.

2. The method of preparing a phenolic condensation product which comprises reacting phenol with formaldehyde in the presence of trimethyl benzyl ammonium hydroxide.

3. The method of preparing a phenolic condensation product which comprises reacting phenol with formaldehyde in the presence of trimethyl benzyl ammonium phenate until a resin is precipitated upon the addition of water to a cooled sample of the reaction mass.

4. A condensation product of phenol, formaldehyde and tetramethyl ammonium hydroxide.

5. A condensation product of phenol, formaldehyde and trimethyl benzyl ammonium hydroxide.

6. A condensation product of phenol, formaldehyde and trimethyl benzyl ammonium phenate.

7. The method of preparing a phenolic condensation product which comprises reacting a phenolic body and a methylene containing substance in the presence of a quaternary ammonium base.

8. The method of preparing a phenolic condensation product which comprises reacting a phenolic body and a methylene containing substance in the presence of a basic quaternary ammonium salt of a phenol.

9. A condensation product of phenol, formaldehyde and a quaternary ammonium base.

10. A condensation product of phenol, formaldehyde and a basic quaternary ammonium salt of phenol.

11. Process of preparing a resinous product which comprises reacting a phenolic body with a methylene-containing substance in the presence of a member selected from the group consisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibium atoms are replaced by hydrocarbon radicals.

12. Process of preparing a resinous product which comprises reacting a phenolic body with a methylene-containing substance in the presence of a member selected from the group consisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibium atoms are replaced by hydrocarbon radicals, until phase separation occurs in a cooled sample extracted from the reaction mass.

13. Process of preparing a resinous product which comprises reacting a phenolic body and a methylene-containing substance in the presence of a member selected from the group consisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibium atoms are replaced by hydrocarbon radicals, until phase separation is caused by the addition of water to a cooled sample of the reaction mass.

14. Process of preparing a phenolic resinous product which comprises reacting a phenol with formaldehyde in the ratio of 1 mol of the phenol to 0.8 to 2.5 mols of formaldehyde in the presence of a member selected from the group consisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibium atoms are replaced by hydrocarbon radicals, until a resin is precipitated upon the addition of water to a cooled sample of the reaction mass, acidifying the reaction mass, and dehydrating.

15. Process of preparing a phenolic resinous product which comprises reacting a phenol with formaldehyde in the ratio of 1 mol of the phenol to 0.4 to 3 mols of formaldehyde in the presence of a member selected from the group consisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibium atoms are replaced by hydrocarbon radicals, until a resin is precipitated upon the addition of water to a cooled sample of the reaction mass, acidifying the reaction mass, and dehydrating.

16. Process as specified in claim 15 in which the acid used for acidification is selected from the group consisting of citric, tartaric and lactic acids.

17. The resinous reaction product of a phenolic body with a methylene-containing substance and a member selected from the group consisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibonium atoms are replaced by hydrocarbon radicals.

18. The resinous reaction product of a phenolic body, a methylene-containing substance and a member selected from the group conisting of quaternary ammonium, sulfonium, phosphonium, arsonium, stibonium and pyridinium bases and the phenolic salts thereof in which all the hydrogen atoms attached to the nitrogen, sulfur, phosphorus, arsenic and stibonium atoms are replaced by hydrocarbon radicals, and the product acidified by the addition of an acid selected from the group consisting of citric, tartaric and lactic acids.

19. Process of preparing a resinous product which comprises reacting a phenolic body with a methylene-containing substance in the presence of a quaternary ammonium base in which all the hydrogen atoms attached to the nitrogen are replaced by hydrocarbon radicals.

20. Process of preparing a resinous product which comprises reacting a phenolic body with a methylene-containing substance in the presence of a quaternary ammonium base in which all the hydrogen atoms attached to the nitrogen are replaced by hydrocarbon radicals, acidifying, dehydrating the reaction mass, casting the product into molds, and heat-hardening the product.

21. Resinous reaction product of a phenolic body with a methylene-containing substance and a quaternary ammonium base in which all the hydrogen atoms attached to the nitrogen are replaced by hydrocarbon radicals.

JAMES L. BRANNON.